(12) United States Patent
Terreault

(10) Patent No.: US 7,254,827 B1
(45) Date of Patent: Aug. 7, 2007

(54) INGRESS MONITORING SYSTEM AND METHOD

(75) Inventor: Gérard Terreault, Pierrefonds (CA)

(73) Assignee: Sunrise Telecom Incorporated, San Jose, CA (US)

( * ) Notice: Subject to any disclaimer, the term of this patent is extended or adjusted under 35 U.S.C. 154(b) by 0 days.

(21) Appl. No.: 09/567,085

(22) Filed: May 8, 2000

(51) Int. Cl.
H04N 7/173 (2006.01)
(52) U.S. Cl. .................................. 725/125; 714/712
(58) Field of Classification Search ........ 725/106–107, 725/125–128, 121, 124, 112; 348/192, 198, 348/180
See application file for complete search history.

(56) References Cited

U.S. PATENT DOCUMENTS

| | | |
|---|---|---|
| 4,207,431 A | 6/1980 | McVoy |
| 4,241,416 A | 12/1980 | Tarczy-Hornoch |
| 4,244,024 A | 1/1981 | Marzalek et al. |
| 4,408,227 A | 10/1983 | Bradley |
| 4,494,138 A | 1/1985 | Shimp |
| 4,520,508 A | 5/1985 | Reichert, Jr. |
| 4,554,663 A | 11/1985 | Pham van Cang |
| 4,561,093 A | 12/1985 | Doane et al. |
| 4,578,638 A | 3/1986 | Takano et al. |
| 5,608,428 A | 3/1997 | Bush |
| 5,751,766 A | 5/1998 | Kletsky et al. |
| 5,777,662 A * | 7/1998 | Zimmerman ................ 725/125 |
| 5,874,992 A * | 2/1999 | Caporizzo .................. 348/192 |
| 5,881,362 A | 3/1999 | Eldering et al. |
| 5,930,231 A * | 7/1999 | Miller et al. ................ 370/210 |
| 5,939,887 A | 8/1999 | Schmidt et al. |
| 5,943,604 A | 8/1999 | Chen et al. |
| 5,956,074 A | 9/1999 | Sclafani |
| 5,963,844 A | 10/1999 | Dail |
| 6,215,514 B1 * | 4/2001 | Harris ......................... 725/74 |
| 6,385,773 B1 * | 5/2002 | Schwartzman et al. ..... 725/124 |

(Continued)

*Primary Examiner*—Scott E. Beliveau
*Assistant Examiner*—James Sheleheda

(57) ABSTRACT

A system for monitoring reverse paths of a bi-directional cable communication network such as a CATV network, to detect and analyze ingress signals entering a reverse path and ending at a network sub-headend or headend through a corresponding one of communication lines, comprises a plurality of radio frequency signal detectors connected thereto. The radio frequency signal detectors are provided with bandpass filter for receiving a radio frequency signal within the frequency band used, to generate corresponding output signals indicative of the strength of the received radio frequency signal. The output signal generated by the frequency signal detector which is coupled to the communication line corresponding to the ingress signal carrying path is indicative of the strength of the received ingress signal with received reverse signals. The system further comprises a signal processor for analyzing the detector output signals through comparison with one or more predetermined ingress thresholds to generate an alarm signal whenever the ingress signal is detected. The system further comprises a control computer receiving the alarm signal to generate monitoring sequence control data indicative of the communication line corresponding to the ingress signal carrying path to be monitored. The system also comprises a selector switch having a plurality of inputs being connected to the communication lines and being responsive to the monitoring sequence control data to select the input connected to the communication line to be monitored, and signal monitoring instrumentation such as a spectrum analyzer and a broadband analyzer coupled to an output of the switching device and being responsive to the monitoring sequence control data for analyzing the ingress signal and generating alarm message data accordingly. The control computer receives the alarm message data to further generate diagnostic sequence control data for the monitoring instrumentation also used to determine source characteristics of the ingress signal.

22 Claims, 10 Drawing Sheets

U.S. PATENT DOCUMENTS

| | | | |
|---|---|---|---|
| 6,559,756 B2 * | 5/2003 | Al-Araji et al. | 340/286.01 |
| 6,574,797 B1 * | 6/2003 | Naegeli et al. | 725/120 |
| 6,728,968 B1 * | 4/2004 | Abe et al. | 725/124 |
| 7,003,414 B1 * | 2/2006 | Wichelman et al. | 702/76 |

* cited by examiner

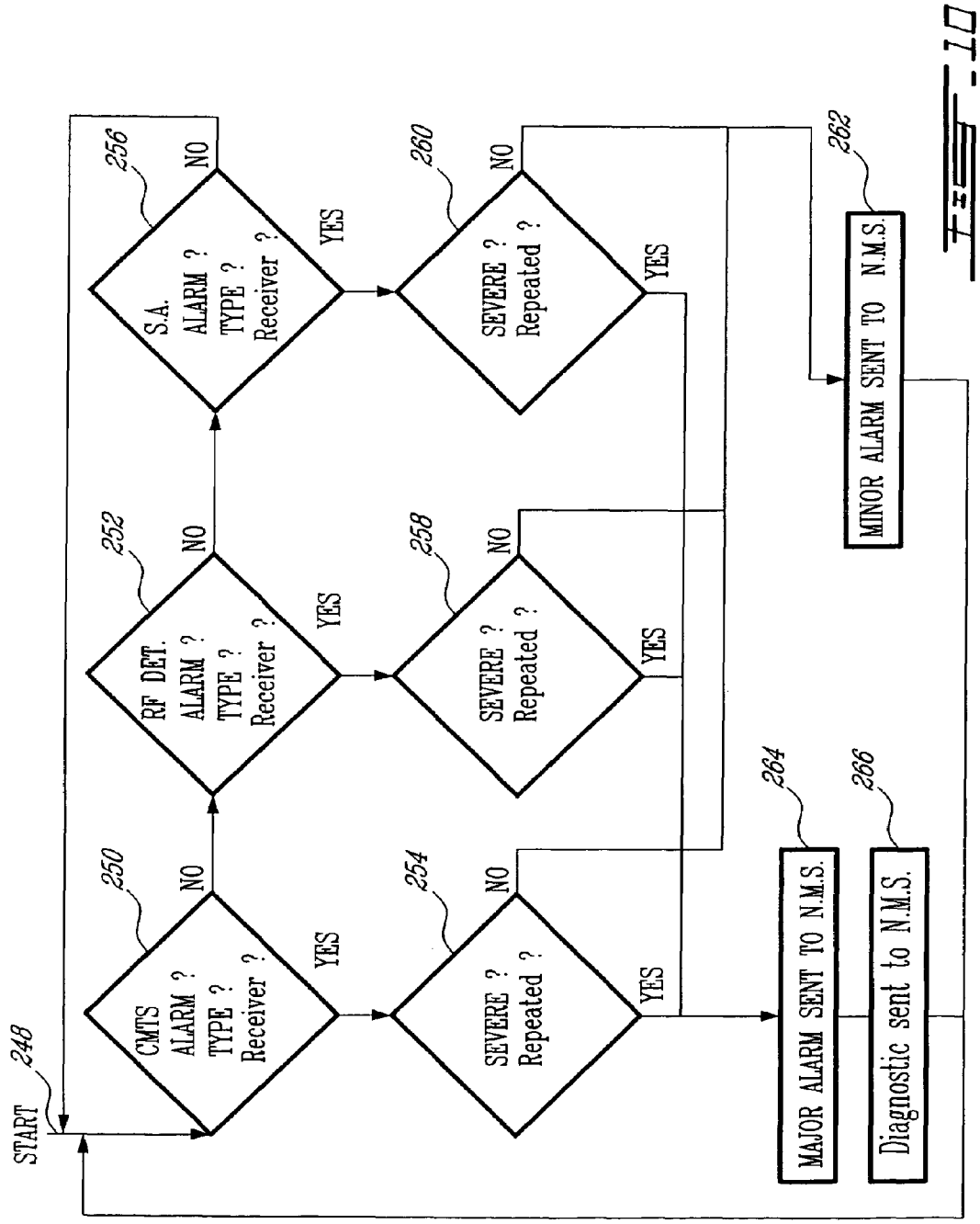

INGRESS MONITORING SYSTEM AND METHOD

FIELD OF THE INVENTION

The present invention relates to the field of monitoring equipment for use with cable communication networks, and more particularly to systems and methods for monitoring reverse paths of bi-directional cable communication networks.

BACKGROUND OF THE INVENTION

Modern cable communication networks such as Community Antenna TeleVision (CATV) communication networks, are increasingly bi-directional, allowing subscribers to receive information in the forward direction (television signals, Internet data, telephony signals, etc.) but also to send information into the network in the reverse direction (Internet data, telephony signals, "Pay-per-view" ordering data, etc.). An almost universal structure of such network is the Hybrid Fiber Coaxial (HFC) where optical fiber links are used between the headend or sub-headends (hubs) and some distribution points or nodes where optical-to-electrical and the electrical-to-optical conversion is performed. Coaxial cables are then used for local distribution and connection to the subscribers.

While almost the same signals are distributed in the forward path across the whole network under the head-end control, the reverse path sees a multiplicity of sources funnelling into the network. It is common to group sources from a neighborhood (from hundreds to thousands of subscribers) into a specific optical fiber link to the head-end (optical node to head-end).

The reverse path data reception can be disturbed by many unwanted ingress sources, that can be either associated with abnormal operation of the network or other sources such as external sources (shortwave transmission, CB transmitter, electrical motors, welding machine, etc.) leaking into the cable or subscriber faulty connection (faulty cable modem, poor grounding, household appliances, etc). The problem is multiplied by the funnelling effect of the HFC structure. There is then a necessity to monitor the reverse path to detect abnormal conditions in order to maintain a quality of service.

Reverse path monitoring systems are fairly recent. The most commonly used technique consists of performing spectral analysis using a scanning spectrum analyzer, either analog or partly digital with band-limited FFT. Due to the high cost of scanning spectrum analyzers, a switch is generally used to select one from a plurality of outputs provided on the node receivers for sequential analysis and detection of abnormal conditions by either a single or a limited number of spectrum analyzers. Switch input size varies from 4 to 16 or even a cascade of 16's. The spectral analysis provides particular measurements of parameters such as varying noise floor and specific band emission. While spectral analysis can be very sensitive and allow the detection of small incremental differences with averaging, detection is limited to long duration disturbances due to the time-sharing monitoring sequence between receiver outputs and to the scanning nature of spectral analysis. This method is widely used by many system available in the marketplace, such as the WinMonitor™ (Avantron Technologies), Pathtrack™ (Wavetek), Phasor™ 565 (Cheetah, formerly Superior Electronics), SIMS I and SIMS II (AM Communications), RDU (Cable Resources Inc.), SST (Trilithic), 3010H Hewlett-Packard-Agilent Calan, SAT 330-CTMS21(SAT Corp.) and CIM (Electroline).

In an attempt to improve ingress detection efficiency for CATV systems, a subscriber terminal using local detection processing was proposed by Reichert in U.S. Pat. No. 4,520,508 issued on May 28, 1985, which terminal comprises a signal level measurement receiver being tuned to monitor a possible ingress signal entering the system at selected frequencies within the frequency band of the return paths, and to generate a detected ingress signal accordingly. The terminal further comprises a control signal receiver which receives forward command signals sequentially transmitted by a controller located at the headend of the cable system, specifying the address of the subscriber terminal, the frequencies at which ingress signals is to be monitored and the return signal transmitting frequency. The terminal further comprises a microprocessor receiving the detected ingress signal and the received control signals for controlling the measurement receiver accordingly, and a frequency transmitter connected to the microprocessor and to the cable system to transmit information concerning the detected ingress to the headend. Although such local detection processing approach may improve detection efficiency over known monitoring systems using a centralized processing approach, actual monitoring cycle for each terminal detector is limited by the rate of forward command signals received from the controller located at the headend which sequentially control all the terminal detectors of the system. Moreover, the cost of such distributed system may be prohibitive since each terminal must be provided with particular electronic hardware.

Another known method uses sampling for signal analysis, which can be performed with a band-limited analyzer such as a 1.5 MHz band as provided by Cheetah's DSP-565, or with may any other spectrum analyzer used in zero scan mode. With the DSP-565, FFT is performed on the samples for finer frequency resolution. A similar spectral window approach is taught by Schmidt et al. in U.S. Pat. No. 5,939,887 issued on Aug. 17, 1999, in which data representative of a cable spectral energy level is acquired over a selected frequency window and is then compared against a threshold value corresponding to the minimum energy level of a TDMA carrier signal. Whenever the spectral energy level is found to be lower than the threshold, a display is generated characterizing the ingress over the window. Such data pre-processing approach obviates the difficulty of discriminating an ingress signal during periods of active carrier signal transmission, by triggering the measurement only when a carrier signal interruption is detected. However, when the transmitting data flow is approaching the maximum transmission capacity of the reverse path, the probability to detect an ingress during an inactive transmission period decreases, reducing the reliability of monitoring accordingly.

Another approach used by the Hotzman Engineering system consists of sampling over the whole bandwidth of the return path for analysis in time and frequency domains. The use of a sampling oscilloscope with data transfer under IEEE488 to a PC for software analysis slows down the time response of the system.

In all of the foregoing approaches, actual monitoring of the return path is not continuous due to the time sharing between receiver outputs (through switches), between local detectors (distributed system) or between frequency bands (spectrum analyzer scan), or due to data pre-processing, transfer and analysis. High equipment costs preclude providing each receiver output with an analyzer for continuous monitoring.

SUMMARY OF THE INVENTION

It is therefore a main object of the present invention to provide cost effective system and method for monitoring reverse paths of a bi-directional cable communication network to detect an ingress signal entering the network.

It is a further object of the invention to provide ingress monitoring system and method which combine continuous detection of ingress signals and selective analysis thereof.

According to the main object, from a broad aspect of the present invention, there is provided a system for monitoring reverse paths of a bi-directional cable communication network to detect and analyze an ingress signal entering and carried by one of said reverse paths within a frequency band assigned thereto for carrying reverse signals, said ingress signal carrying path ending to a network sub-headend or headend through a corresponding one of a plurality of communication lines connected thereto. The system comprises a plurality of radio frequency signal detectors respectively coupled to said plurality of communication lines at the sub-headend of headend, said radio frequency signal detectors being provided with bandpass filter means for receiving any radio frequency signal within the frequency band to generate corresponding output signals indicative of the strength of the received radio frequency signal, one of said frequency signal detectors being coupled to the communication line corresponding to the ingress signal carrying path for receiving the ingress signal with any said reverse signals to generate corresponding one or more of said output signals which are indicative of the strength of the received ingress signal with any said received reverse signals. The system further comprises signal processor means for analyzing the detector output signals through comparison with one or more predetermined ingress thresholds to generate an alarm signal whenever the ingress signal is detected.

According to the mentioned-above objects, the system preferably further comprises controller means receiving the alarm signal to generate monitoring sequence control data indicative of the communication line corresponding to the ingress signal carrying path to be monitored. The system also preferably comprises switch means having a plurality of inputs being connected to the communication lines and being responsive to the monitoring sequence control data to select the input connected to the communication line to be monitored and signal monitor means coupled to an output of the switch means and being responsive to the monitoring sequence control data for analyzing the ingress signal.

According to the main object, from another broad aspect of the invention, there is provided a method of monitoring reverse paths of a bi-directional cable communication network to detect and analyze an ingress signal entering and carried by one of said reverse paths within a frequency band assigned thereto for carrying reverse signals, said ingress signal carrying path ending to a network sub-headend or headend through a corresponding one of a plurality of communication lines connected thereto. The method comprises the steps of: a) detecting the ingress signal with any said reverse signals at said sub-headend of headend to generate an output signal indicative of the strength of the received ingress signal with any said received reverse signals; and b) analyzing the detector output signals through comparison with one or more predetermined ingress thresholds to generate an alarm signal whenever the ingress signal is detected.

According to the above-mentioned objects, the method preferably further comprises the steps of: c) processing the alarm signal to generate monitoring sequence control data indicative of the communication line corresponding to the ingress signal carrying path to be monitored; d) selectively monitoring said ingress signal communication line according to the monitoring sequence control data; and e) analyzing the ingress signal accordingly.

BRIEF DESCRIPTION OF THE DRAWINGS

A preferred embodiment of a system and method according to the present invention will now be described in detail with reference to the accompanying drawings in which:

FIG. 10, is a flow sheet representing an example of monitoring and diagnostic sequences generation by the control computer provided in the system according to the preferred embodiment.

DETAILED DESCRIPTION OF THE PREFERRED EMBODIMENT

Figure 1:
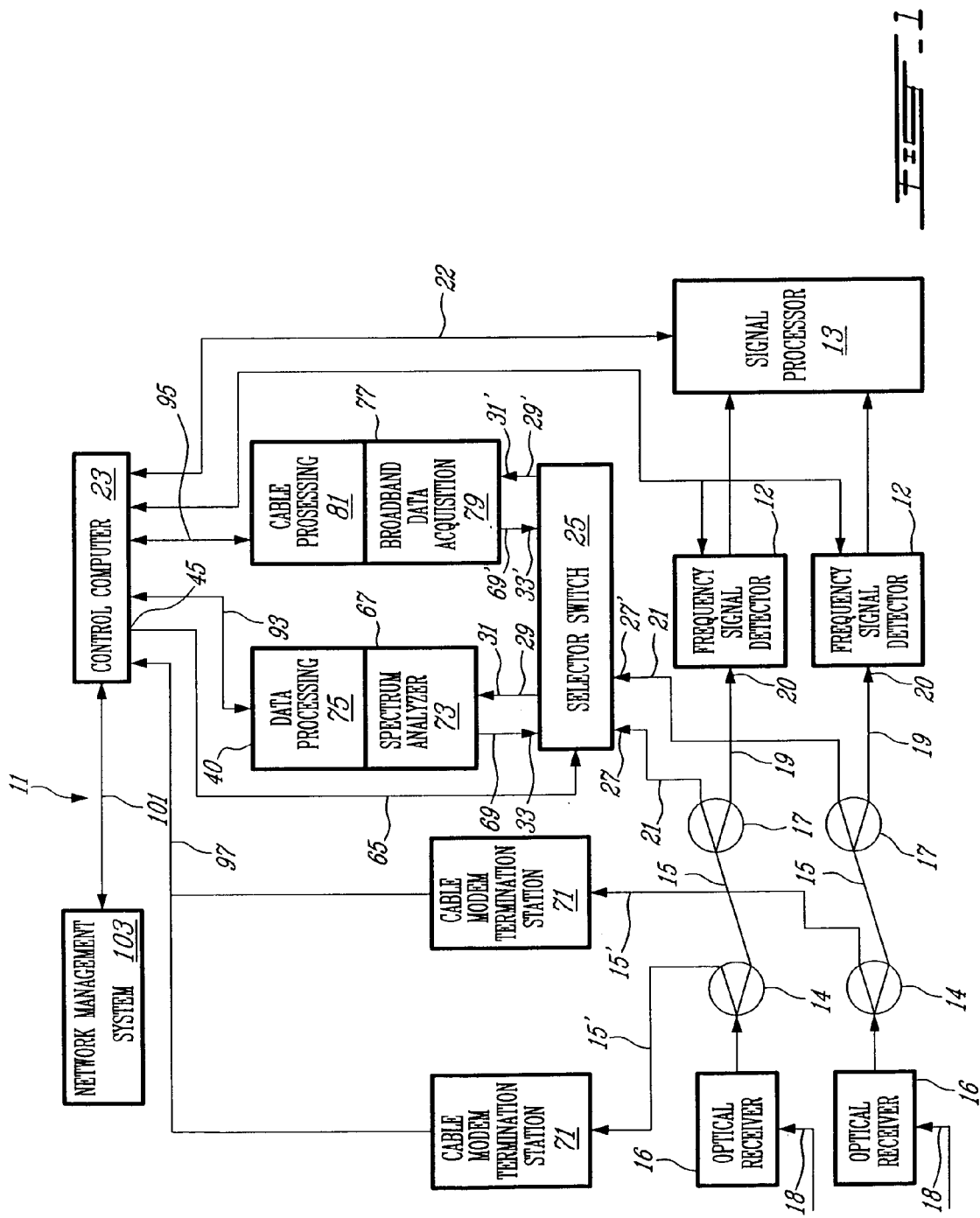
FIG. 1 is a general block diagram of the preferred embodiment of the monitoring system according to the invention.

Referring now to FIG. 1, the monitoring system generally designated at 11 comprises a plurality of "glitch", radio frequency signal detectors 12, each of which is coupled at input 20 thereof through series connected first splitter 14, reverse path line 15, second splitter 17 and reverse path line 19 to a respective one of a plurality of optical receivers 16 located at a headend or sub-headend of a CATV communication network of a HFC type, to receive from one of a multiplicity of nodes (not shown) through a respective fiber optic communication line 18, reverse path signals sent by subscribers connected to the node through drop lines made of coaxial cable. It is to be understood that the present invention may be advantageously used with communication networks adapted to the transmission of other types of data such as Internet data or telephony, as well as with other types of communication networks such as wholly fiber-based or coaxial-based networks. Where the fiber optic communication line 18 makes use of a single reverse path frequency band, a single frequency detector 12 which is limited to the chosen frequency band may be used for each receiver 16. Multiple reverse path frequency bands are commonly employed to share a same optical fiber and receiver, wherein each band is conveniently "stacked" in frequency such as 5 to 42, 55 to 92, 105 to 142 and 155 to 192 MHz, without being limited to that particular assignment. In such cases, a plurality of frequency detectors 12 corresponding to the number of stacked frequency bands used may be coupled to the output of each receiver 16, each of which detectors being adapted to received a specific frequency band. Each optical receiver 16 associated with each reverse path communication line 18 converts the optical signals into reverse path electrical signals which are also first directed to cable modem termination stations (CMTS) 71 as part of the network but outside of the system 11, through the splitter 14 and reverse path lines 15', which CMTS 71 are used to decode reverse transmissions from the subscribers. The decoding function of the CMTS 71 includes demodulation as well as error detection and correction, the data stream being also sent to a higher level protocol, as will be explained later in more detail.

Figure 2:
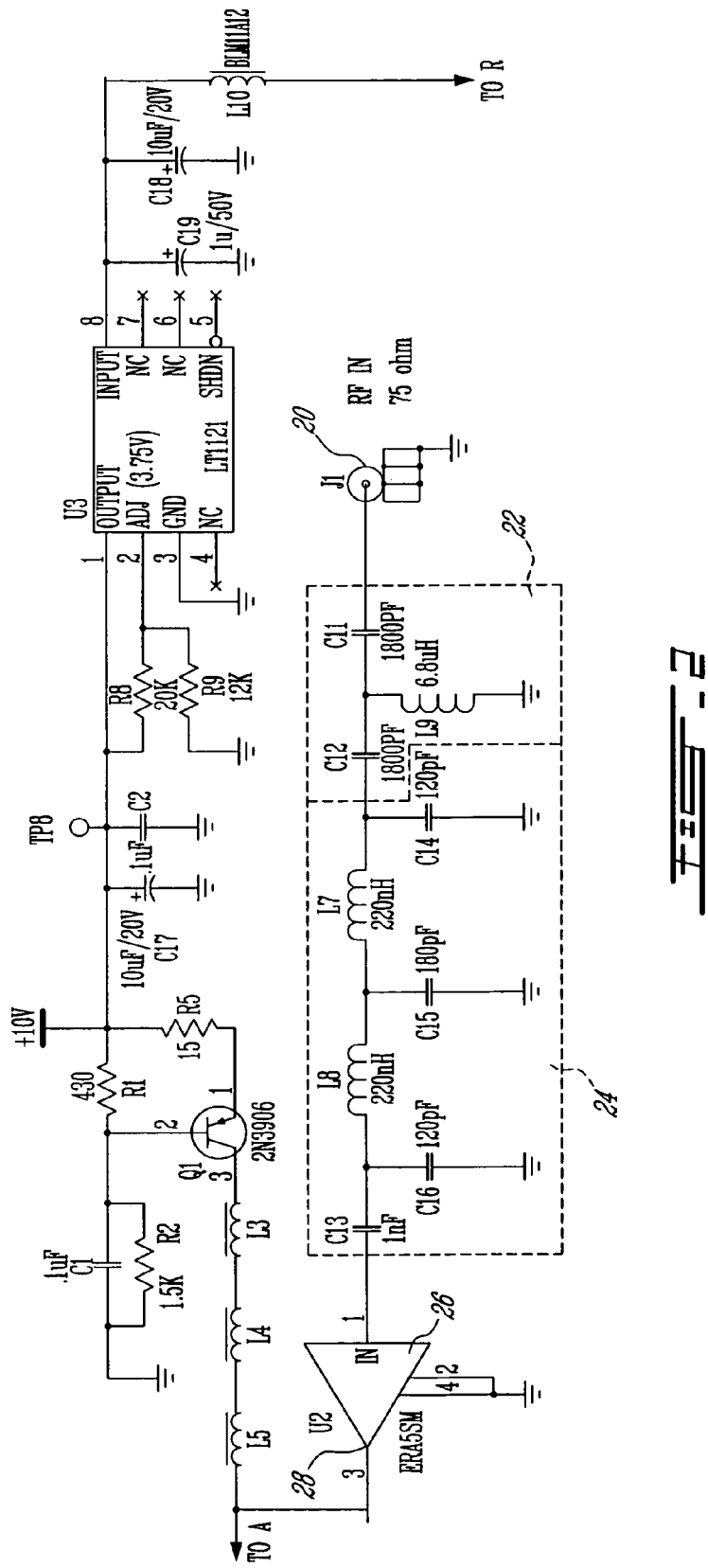
FIGS. 2 to 7 are detailed electronic diagrams showing the various circuits forming the radio frequency signal detector according to the preferred embodiment.
Figure 3:
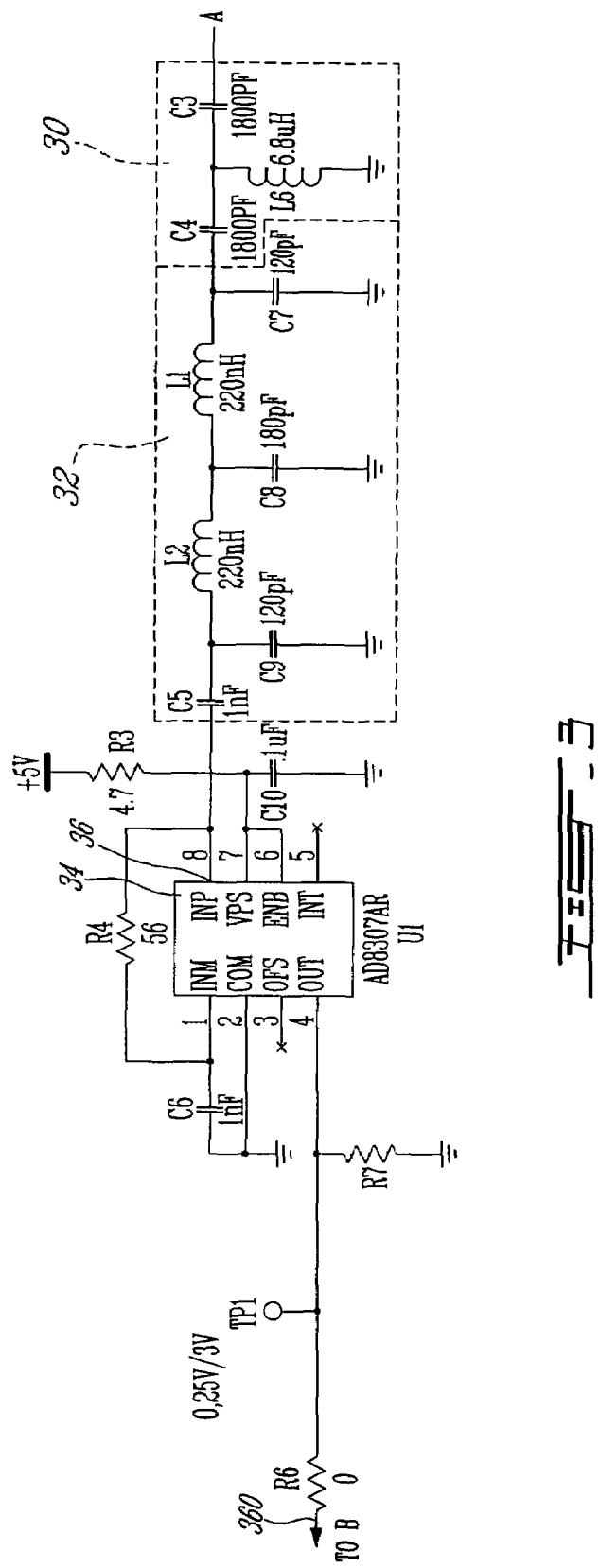
Figure 4:
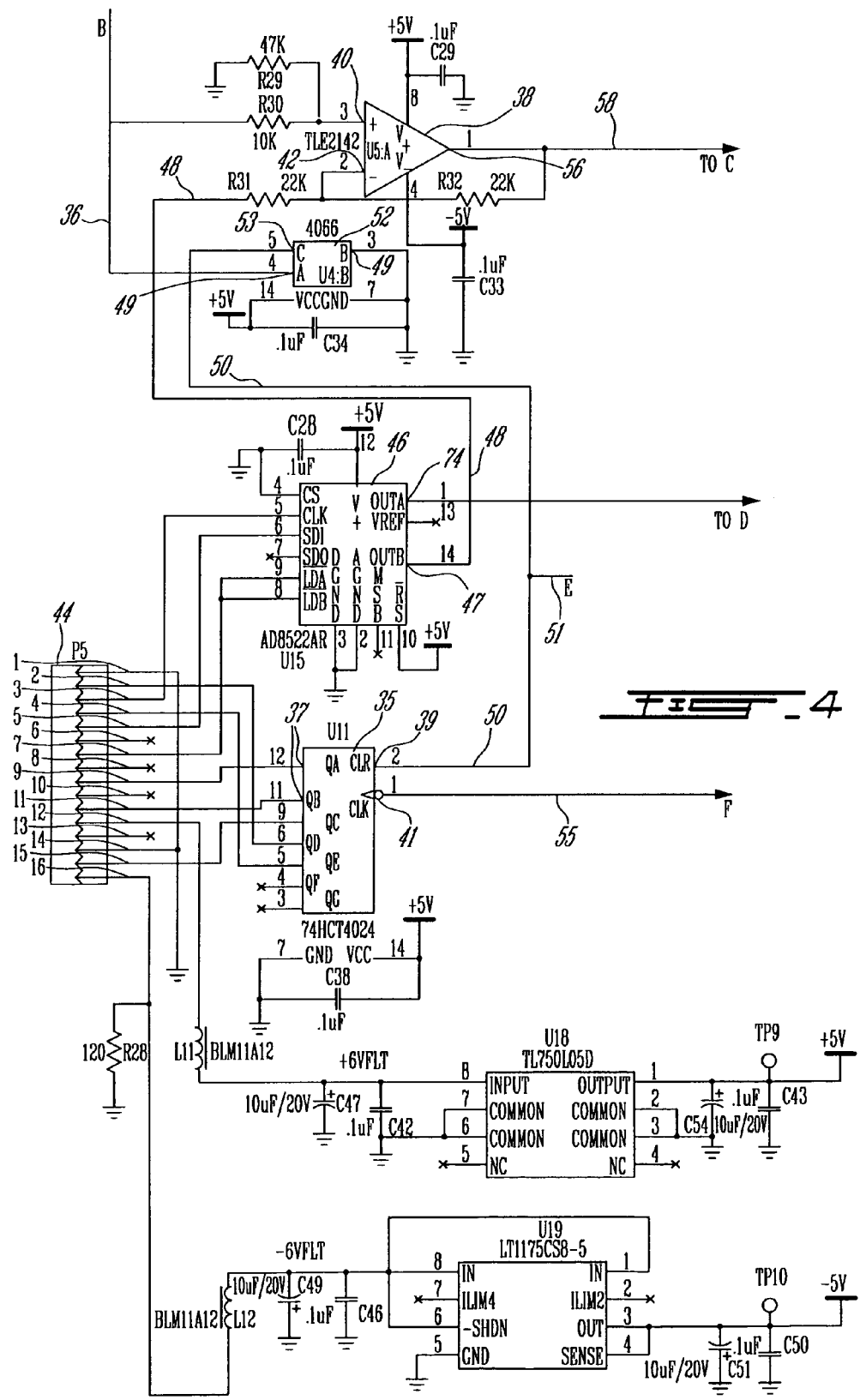
Figure 5:
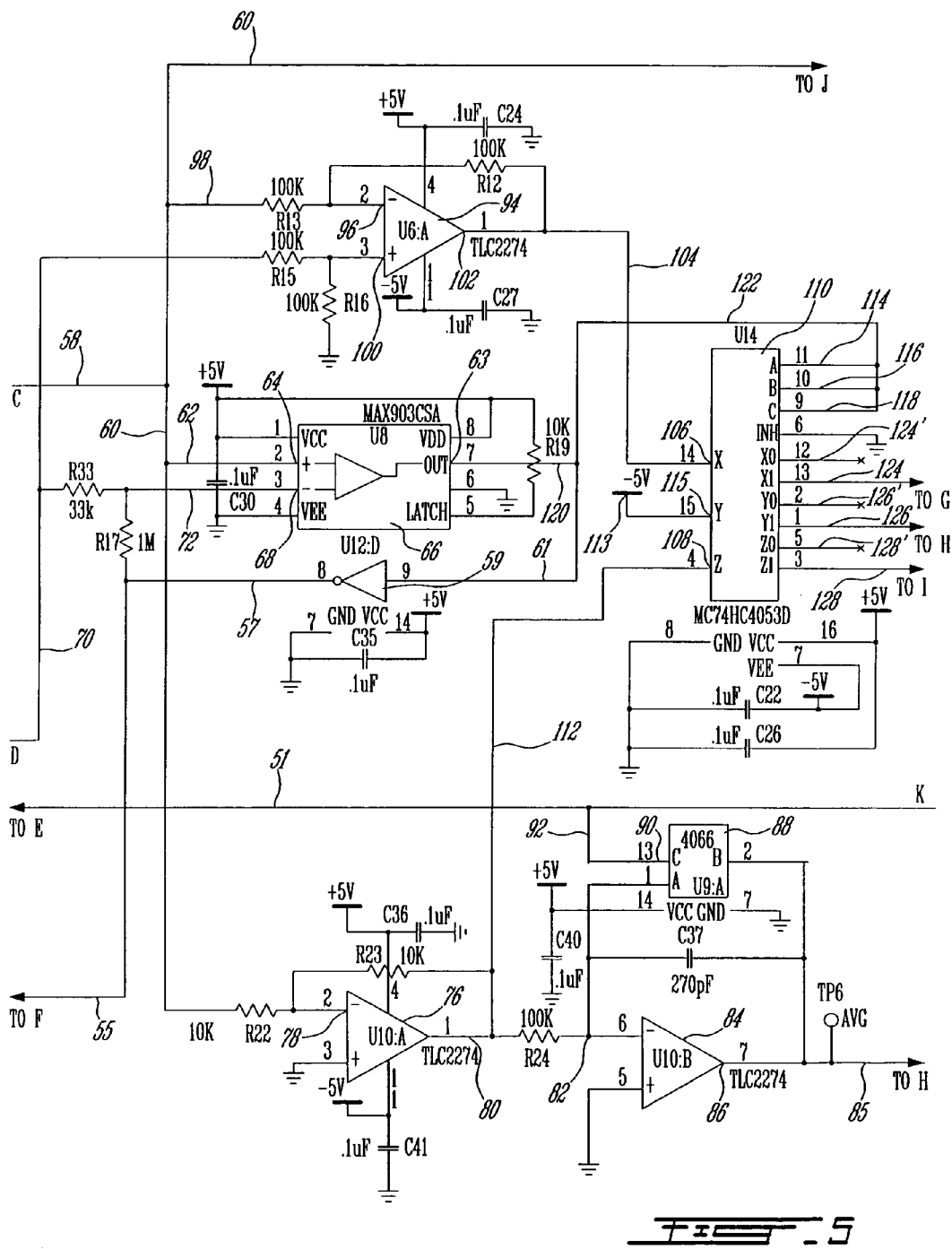

A radio frequency detector adapted to the 5-42 Mhz frequency band as used in North America will be now described in detail with reference to FIGS. 2 to 7. The low cost design characterizing the radio frequency detector shown may readily adapted to any other frequency band to advantageously provide a plurality of such radio frequency detectors required by multiple path frequency bands. Turning now to FIG. 2, connected to the input terminal 20 provided on the RF detector is a band-pass filter circuit comprising first high-pass filter 22 and first low-pass filter 24 followed by a 20 dB gain amplifier 26, the output 28 of which is coupled to second high-pass filter 30 and second low pass filter 32 as shown in FIG. 3, to achieve a proper overall filtering (40 dB rejection at 2 and 55 MHz). The RF detector further includes a wide band logarithmic detector/amplifier 34, such as AD8307 from Analog Devices, to which is applied the filtered signal through an input 360 thereof. A logarithmic detector/amplifier is conveniently used due to its scale compression characteristic, but a linear (such as Schottky RF detector diode) or other scale could be also used. Received output signal voltage at the output line 36 from the logarithmic detector/amplifier 34 typically varies from 0.25 Vdc to 2.5 Vdc for an input signal of −70 dBm to +15 dBm in 50 ohms, and represents a measurement of the detected received power. As shown in FIG. 4, the RF detector further includes a first buffer circuit which is based on an op-amp 38 having a first positive terminal 40 to which the receiver output signal is fed and receiving at a second negative terminal 42 in a feedback configuration, a control voltage signal from a control computer which will be described later in more detail, through first connector 44, digital to analog (D/A) converter 46 and line 48 connected thereto at a first output 47. The first buffer also includes a switch device 52 connected at a first terminal 49 thereof to the line 36 and having a second terminal 49' being coupled to ground. The switch device 52 further has a control terminal 53 for receiving a reset signal through lines 50 and 51 from a data processor the function of which will be explained later in detail. The buffered signal generated at an output 56 of the op-amp 38 is fed to a plurality of further circuits for performing basic characteristic analysis, to generate therefrom output signals indicative of the strength of the received radio frequency signal, as will be described later in more detail. The buffered signal is directed through lines 58, 60 and 62 to a first positive input 64 of an amplitude level comparator 66 as shown in FIG. 5. Referring back to FIG. 4, there is also provided a digital counter 35 receiving the same reset signal at a first input 39 thereof through lines 51 and 50, and also receiving a count control signal at a second input 41 thereof from an output 63 provided on the amplitude comparator 66 as shown in FIG. 5, through lines 61, inverter 59, lines 57 and 55. The count control signal is generated by the amplitude comparator 66 whenever the amplitude level signal successively raises above and drops below the amplitude threshold according to one or more amplitude cycles. The digital counter 35 generates at one of outputs 37 thereof an output signal representing a number of amplitude cycles since a last reset, designated hereinafter as the threshold cycle signal, which signal indicative of fast varying disturbances, is directed through the connector 44 and bus buffers (not shown) to the data processor, as will be explained later in more detail. A second negative input 68 connected in a feedback configuration through resistor R33 and inverter 59 is also coupled through line 70, resistor R33 and line 72 to a second output 74 provided on the D/A converter 46 as shown in FIG. 4, for transmitting to the comparator 66 an amplitude threshold signal according to control data sent by the control computer through the connector 44. The RF detector includes a first inverting amplifier circuit which is based on an op-amp 76 having a negative input 78 receiving the buffered signal through lines 58 and 60. The inverted output signal at 80 is first fed through a resistor R24 to an input 82 of a first integrator circuit which is based on an op-amp 84 for generating at an output thereof and through a line 85 a signal whose level is proportional to the amplitude integration of the received output signal since the last reset, designated hereinafter as the integrated received signal. Such signal provides an indication, without being a true mathematical representation, of the average received power during the integration period. Connected between op-amp input 82 and output 86 as part of the feedback control loop across capacitor C37 is a switch device 88 having a control input 90 for receiving through lines 51 and 92 the same reset signal as discussed before. The RF detector further includes a second inverting amplifier circuit which is based on an op-amp 94 also receiving at a negative input 96 thereof the buffered signal through lines 58, 60, 98 and resistance R13. The op-amp 94 receives at a positive input 100 thereof through D/A converter 46, line 70 and resistor R15 the amplitude threshold signal according to the control data sent by the control computer through the connector 44. The op-amp 94 generates at an output 102 thereof a signal which is proportional to the amplitude of the buffer signal which is above the amplitude threshold. This above-threshold indicative signal is sent through a line 104 to a first input 106 of a first multiple switch device 110 also receiving at a second input 108 the inverted output signal from the op-amp 76 through a line 112, while a reference voltage source 113 is applied to a third input 115. The multiple switch device 108 is provided with three control inputs 114, 116, 118 simultaneously receiving through lines 120, 122 the comparator output signal. The multiple switch device 108 is also provided with three pairs of outputs 124, 124', 126', 126, 128, 128' respectively associated with inputs 114, 116 and 118, wherein outputs 124', 126', 128' end to open circuits.

Figure 6:
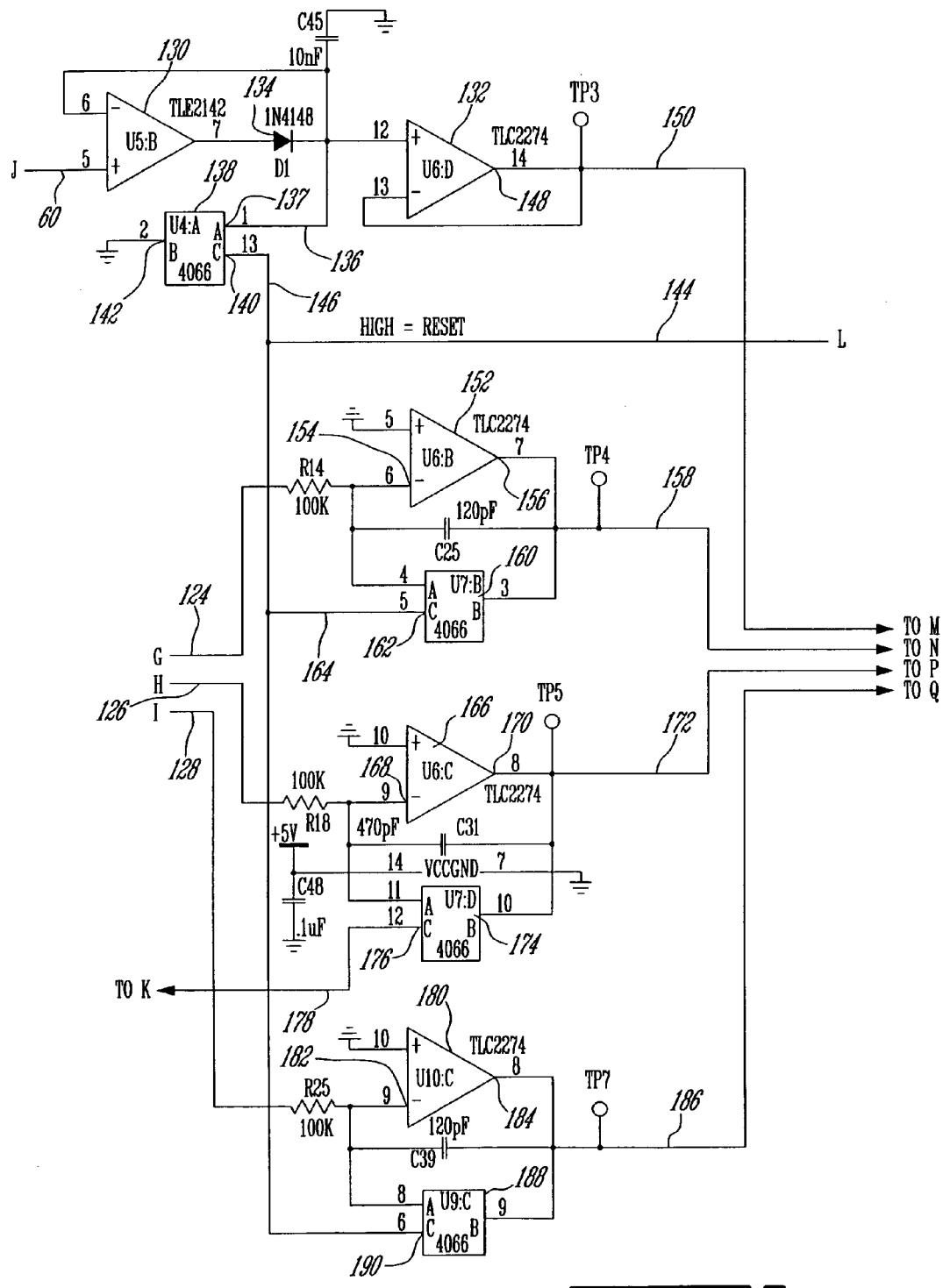

Referring now to FIG. 6, the RF detector further includes an active peak-and-hold detector circuit receiving the buffered signal through the line 60, which circuit is based on a pair of op-amps 130, 132 that are series connected through a diode 134, the output terminal of which being also connected through a line 136 to a first terminal 137 of a switch device 138 having a second terminal 140 being coupled to ground and a control terminal 142 receiving the reset signal from lines 144, 146. The peak-and-hold detector generates at an output 148 thereof and through a line 150 a signal that is proportional to the peak amplitude detected since the last reset, designated hereinafter as the peak amplitude signal. The RF detector also includes a second integrator circuit which is based on an op-amp 152 having a negative input 154 receiving through line 124 and resistor R14 the above-threshold indicative signal. This second integrator circuit generates at an output 156 thereof and through a line 158 a signal representing an integrated value for the amplitude level signal over a time during which the amplitude level signal exceeds the amplitude threshold, designated hereinafter as the integrated above-threshold signal. Connected between op-amp input 154 and output 156 as part of the feedback control loop across capacitor C25 is a switch device 160 having a control input 162 for receiving through lines 144, 146 and 164 the same reset signal as discussed before. The RF detector further includes a third integrator circuit which is based on an op-amp 166 having a negative input 168 receiving through line 126 and resistor R18 the reference voltage signal from the source 113 shown in FIG. 5. This third integrator circuit generates at an output 170 thereof and through a line 172 a signal representing a cumulative time during which the level signal exceeds the amplitude threshold, designated hereinafter as the above-threshold time signal. Connected between op-amp input 168 and output 170 as part of the feedback control loop across capacitor C31 is a switch device 174 having a control input 176 for receiving the reset signal through lines 144, 146 and 178. The RF detector further includes a fourth integrator circuit which is based on an op-amp 180 having a negative input 182 receiving through line 128 and resistor R25 the inverted output signal. This fourth integrator circuit generates at an output 184 thereof and through a line 186 a signal representing an integrated value for the amplitude level signal over a time during which the level signal exceeds the amplitude threshold, designated hereinafter as the integrated received above-threshold signal. Connected between op-amp input 182 and output 184 as part of the feedback control loop across capacitor C39 is a switch device 188 having a control input 190 for receiving the reset signal through lines 144, 146.

Figure 7:
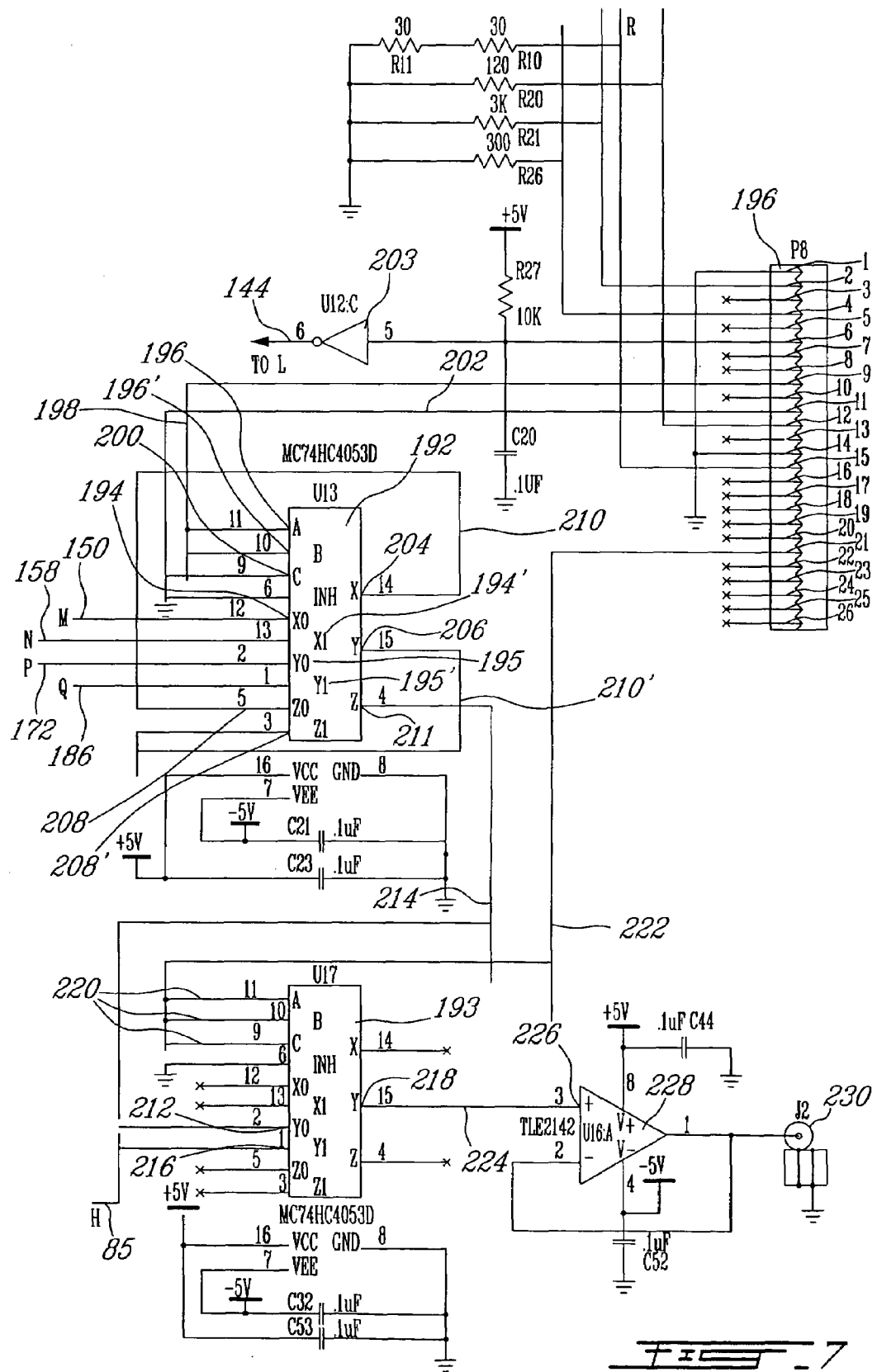

Referring now to FIG. 7, the RF detector further includes switch devices 192, 193 connected in cascade. The switch device 192 receives at a first pair of inputs 194, 194' the peak amplitude signal and the integrated above-threshold signal through lines 150, 158, respectively, while receiving at a second pair of inputs 195, 195' the above-threshold time signal and the integrated received above-threshold signal through lines 172, 186, respectively. The switch device 192 is provided with control inputs 196, 196' linked to a second connector 196 through a line 198, and with a third control input 200 linked to the second connector 196 through a line 202. The second connector 196 receives control signals for the RF detector 12 including the reset signal, through line 144 and inverter 203, from the data processor as will be explained later in detail. The switch device 192 has first and second outputs 204 and 206 which are connected in turn to a third pair of inputs 208, 208' through lines 210, 210', and a third output 211 connected to a first input 212 of the switch device 193 through a line 214, a second input 216 receiving the integrated received signal through the line 85 linked to the op-amp 84 shown in FIG. 5. The switch device 193 is provided with control inputs 220 linked to the second connector 196 through a line 222. The switch device 193 has an output 218 connected through a line 224 to the positive input 226 of a circuit output op-amp 228 for selectively delivering a RF detector output signal at a terminal 230 according to the control signals sent to the switches 192, 193.

The cost of the proposed design for the RF detector is low enough to provide each and all of the reverse path incoming bands with a dedicated RF detector. A multiplicity of RF detectors (typically 16) are conveniently grouped in a single package. Where a single reverse path frequency band is used, each RF detector is connected to a different signal source trough a corresponding communication line.

Referring again to FIG. 1, the monitoring system further comprises a signal processor 13, which is preferably a Digital Signal Processor (DSP) shared by the RF detectors 12 and being integrated in the same package therewith, which signal processor reads the six (6) measurement output signals resulting from the basic analysis performed by each RF detector, namely the integrated received signal, peak amplitude signal, integrated above-threshold signal, above-threshold time signal, integrated received above-threshold signal and threshold cycle signal. The outputs from each RF detector is read at a typical interval of 250 μs, and according to a reset signal sent thereto by the signal processor at each interrogation. From these detector measurement analysis output signals, which are indicative of the strength of the received radio frequency signal, the signal processor 13 performs higher level analysis involving a comparison with one or more predetermined ingress thresholds to generate an alarm signal whenever an ingress signal is detected. Alternatively, a dedicated signal processor or controller could be provided for analyzing the output signals generated by each RF detector 12. Examples of high level analysis performed by the signal processor 13 are trend analysis of the averaged power to detect medium and long term effects, detection of complete loss of incoming power indicating a loss of the optical link, severity detection of impulse noise by either peak amplitude and integrated energy, repeatability, periodicity, impulse length, and percentage of non-availability when above threshold. The results of the analysis are returned to a higher level of ingress monitoring as part of the control software as alarm messages indicating various alarm levels, trends, periodicity or other pertinent characteristics. Various scenarios of processing can be determined by the user, one typical scenario being described next.

A first level of processing generates a programmable weighting factor on the individual outputs as follows:

a) the peak amplitude signal is compared to two (2) thresholds for minor and major abnormality;

b) the above-threshold time signal is compared to a threshold for abnormality detection;

c) the integrated received above-threshold signal is divided by the integrated received signal, the resulting ratio being used as a first severity of abnormality parameter;

d) the integrated received signal is compared to a negative threshold for link loss detection; in addition trend analysis is performed by the ratio of the current integral to that of a minute, an hour and a day ago (as recorded every ¼ minute, ¼ hour and ¼ day, the integral is stored for reference and the current value is compared to the foremost of each quad of values to prevent sudden jump at a reference storing time);

e) the integrated above-threshold signal is divided by the integrated received signal, the resulting ratio being used as a second severity of abnormality parameter;

f) if the threshold cycle signal is $\geq 1$, the differential time stamps are compared with that of the four last records of $\geq 1$, if the time differences are $\leq$ three (3) thresholds, a minor, severe or major abnormality is respectively detected.

A second level of processing may include a summation of the six (6) weighting factors provided by at the first processing level, and comparisons with two (2) thresholds and one out of three (3) decisions:

1) if below both thresholds: no action;

2) if between first and second thresholds: local warning;

3) if above second threshold or if there are four (4) consecutive warnings: generate an alarm message, the alarm message indicating the node causing the alarm, the six (6) weighting factors, the threshold cycle signal and packet envelope.

As shown in FIG. 1, the monitoring system 11 also comprises a controller in the form of a control computer 23 connected to the signal processor 13 receiving the alarm signals from the signal processor 13 through bus line 22 as well as sending control signals thereto, which computer 23 is preferably a computer server as part of a computer network in a server-client architecture. The computer also receives through a bus line 97 error rate signals as sent by outside CMTS 71, to generate an alarm indication whenever abnormal rate is being detected according to a high level protocol programmed in the computer 23. It can also receive outside alarm messages from other outside sources such as network protocol monitoring sources or operator terminals used by subscribers service representatives. The control computer 23 is used to run a specific control software which generates monitoring sequence and diagnostic sequence control data as well as other control and communication tasks, as will be explained later in more detail. This software can be developed by any skilled programmer, in a version for use with standard exploitation systems such as Microsoft Windows™ for a single-user, multiple hubs applications (i.e. sites with a number of RF detectors 12 linked to a same instrumentation) or in a version for use with network exploitation systems such as Microsoft Windows NT™ for multi-users, multiple hubs applications. A particular feature of the software enables the monitoring system 11 to adaptively change running monitoring sequences in response to alarm messages, to analyze sources of alarm signals, and as a basic expert system, to choose from a decision tree one or more tests scenarios to perform.

The control computer 23 is also connected to the management system 103 of the network through a bus line 101. The control software run by the computer 23 may be programmed from the network management system according to operator instructions corresponding to monitoring, diagnostic and alarm handling scenarios. Alarm message status and source characteristics data are also sent by the control computer 23 to the network management system 103.

The monitoring system further comprises a selector switch 25 having a plurality of inputs 27, 27' each being coupled to a respective communication line 18 through the corresponding optical receiver 16, splitter 14, reverse path line 15, splitter 17 and reverse path line 21. The selector switch 25 further has one or more outputs 29, 29' connected to signal monitoring instrumentation through reverse path lines 31, 31' and one or more control inputs 33, 33' connected through control lines 69, 69' to the signal monitoring instrumentation, which will be described later in detail. A further control output 45 provided on the control computer 23 is directly linked to the selector switch through a line 65, to allow control according to a end-user defined system configuration. The selector switch 25 is conveniently packaged with the RF detectors 12 in a same unit. The selector switch 25 is responsive to the monitoring sequence control data to select specific one of input 27, 27' that is connected to the communication line 18 to be monitored as carrying a detected ingress signal. To increase the number of available inputs, a plurality of selector switches 25 may be provided in a cascade configuration.

The monitoring instrumentation includes data processor means which are also responsive to the monitoring sequence control data sent by the control computer for controlling analysis of the ingress signal coming from the selected reverse path line 27 or 27', and for comparing the ingress signal analysis data with predetermined threshold data to generate alarm message data to be sent to the control computer 23, which generates diagnostic sequence control data accordingly. The monitoring instrumentation is further responsive to the diagnostic sequence control data to determine source characteristics of the ingress signal. The monitoring instrumentation preferably includes a frequency scanning spectrum analyzer 67 and/or a sampling broadband signal analyzer 77 which receive respectively through bus lines 93, 95 the monitoring and diagnostic control data from the control computer 23. The selection commands for each switch input 27, 27' is normally sent by respective analyzers 67, 77 through control lines 69, 69', the monitoring sequence stored in each of analyzers 67,77 containing switching sequence data. In case of diagnostic operation, the switch selection is normally sent by the control computer 23 depending on the received alarm indications, through the respective analyzer 67,77 and lines 69, 69'. The number of available selections depends on the number of communication lines 18 and corresponding optical receivers 16.

The spectrum analyzer 67 may be a normal scanning receiver featuring a multiplicity of resolution bandwidths, video bandwidths and sweep rates, frequency and span control as well as zero-scan capability to act as a tunable receiver. Its frequency range covers the full band of reverse path signals, so it can receive stacked bands without the need of de-stacking them, thereby reducing hardware costs. The spectrum analyzer 67 is connected to the selector switch 25 for controlling thereof through the control line 69, and is also connected thereto through the line 31 for receiving a selected reverse path signal from a corresponding one of reverse path lines 21, as described before. The cost of the spectrum analyzer 67 is therefore shared between a multiplicity of nodes, typically a 16 multiple thereof (16, 64, 256 or more nodes) corresponding to the number of communication lines 18 and optical receivers 16. It can run programmed monitoring sequences sent by the control computer or execute specific commands from a local or a remote interface.

The spectrum analyzer 67 is made of two parts, a standard spectrum analyzer module 73 and a local, built-in data processing module 75 for autonomous operation.

The standard spectrum analyzer module 73 includes an attenuator for the input signal, a preamplifier, a mixer and a first IF amplifier-filter. It further includes a first local oscillator with fixed frequency and sweeping capability for the signal tuning function, and a second fixed local oscillator, a mixer and a second IF amplifier-filter. Also included is a logarithmic amplifier-detector and resolution bandwidth filters, as well as base-band processing circuits for performing video filtering, FM-AM demodulation and analog to digital conversion. A digital processor for calibration corrections, hardware setting, data display, user interface, data storage and communications is also included. The built-in data processing module 75 makes use of a specific software, provided with an interface to the external selector switch 25 that is used to select which of a plurality of reverse path signals should be analyzed. The specific software in the analyzer allows it to run a spectral monitoring sequence which is programmable through the software run by the control computer 23. This sequence typically includes the following parameters: sequential order of switch positions, analyzer settings, spectral-related alarm threshold data, and raw data processing such as single or multiple data acquisitions, averaging or peak-hold. The analyzer can then run its monitoring sequence autonomously and either store for later retrieval or send immediately alarm messages to the computer control software depending on the programmed parameters. In accordance with the received spectral monitoring sequence control data, the built-in data processing module 75 compares the ingress signal spectral analysis data with the spectral-related threshold data to generate spectral-related alarm message data sent to the computer 23. In response thereto, the computer control software generates spectral diagnostic sequence control data enabling the built-in data processing module 75 to operate the spectrum analyzer module 73 accordingly, for determining source spectral characteristics of the ingress signal.

The sampling broadband signal analyzer 77 is adapted to sample the whole bandwidth of an incoming reverse path signal, by sampling at a rate higher than the Nyquist frequency to capture all information content of that bandwidth. The broadband analyzer 77 includes filters which allows a selection of stacked sources by either over-sampling or sub-sampling, provided that Nyquist requirements are satisfied. In a similar configuration as used for the spectrum analyzer 67, the broadband analyzer 77 is connected to the selector switch 25 for controlling thereof through the control line 69', and is also connected thereto through the line 31' for receiving a selected reverse path signal from a corresponding one of reverse path lines 21, as described before. Here again, the cost of the broadband analyzer 77 is shared between a multiplicity of nodes. It can run programmed monitoring sequences sent by the control computer or execute specific commands from a local or a remote interface.

The sampling broadband signal analyzer is also made of two parts: a broadband data acquisition module 79 and a local, sampled data digital processing module 81.

Figure 8:
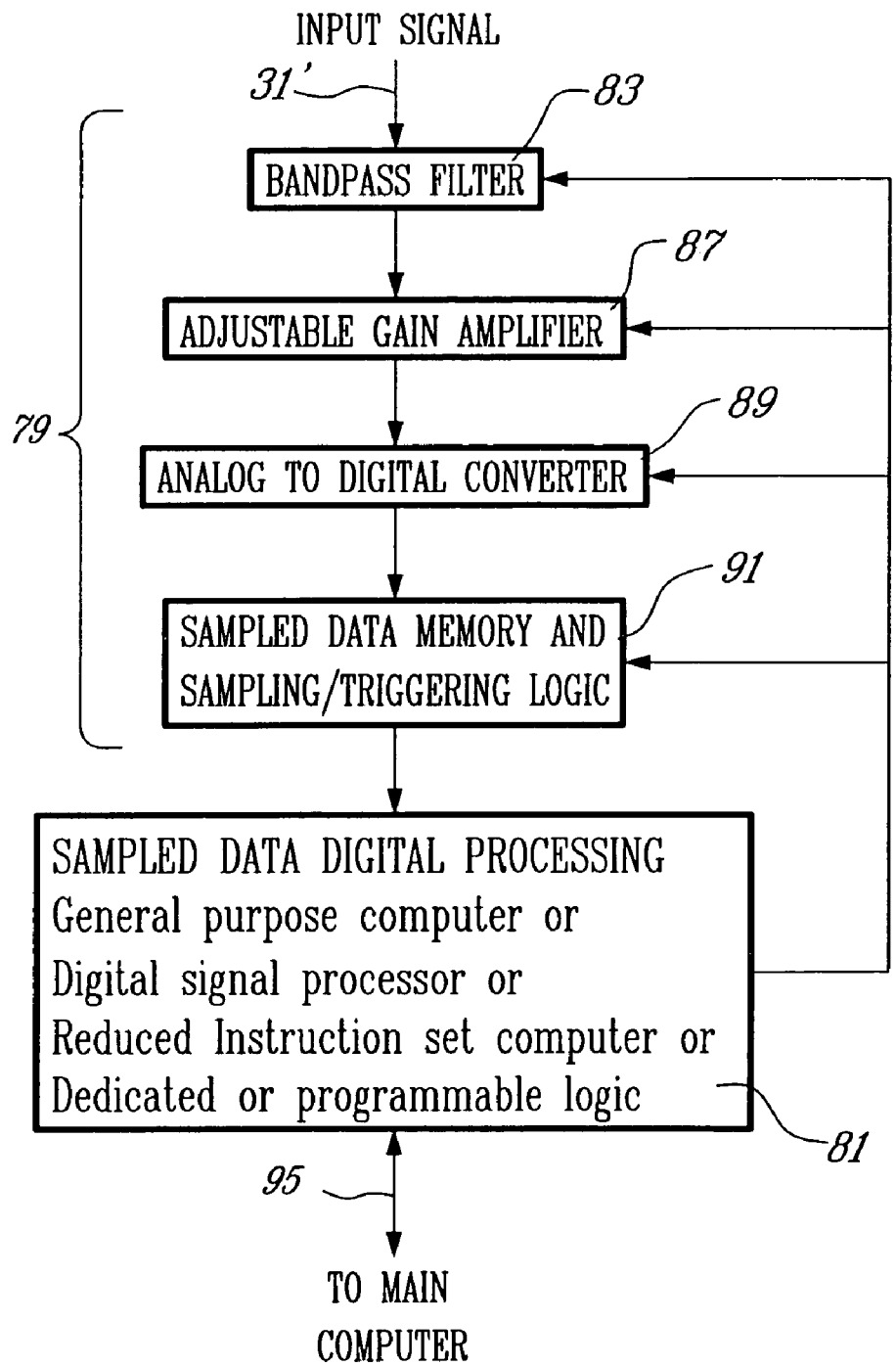
FIG. 8 is a block diagram of a broadband FFT analyzer and time domain analyzer unit according to the preferred embodiment.

Referring now to FIG. 8, the broadband data acquisition module 79 is comprised of a band-pass filter 83 (5 to 42 MHz for instance), an adjustable gain amplifier 87, an analog to digital converter 89 and a sampled data memory and sampling/triggering logic circuit 91, all being connected in series with the sampled data digital processing module 81, which may be a digital signal processor (DSP), a general purpose computer with appropriate software, a reduced instruction set computer (RISC), a dedicated logic circuit or a programmable logic circuit. The input reverse path signal coming from the output 29' of the selector switch 25 shown in FIG. 1 is fed to the band-pass filter 83 through the line 31', while the digital processing module 81 receives broadband monitoring sequence control data from the computer 23 through the bus line 95. In accordance with the received spectral monitoring sequence control data, the digital processing module 81 analyzes the received ingress signal according to set parameters, either in the time domain, such as amplitude and pulse shape analysis, or in the frequency domain, such as FFT spectrum analysis technique, and compare the resulting broadband analysis data with broadband-related threshold data to generate broadband-related alarm message data sent to the computer 23 through the bus line 95. In response thereto, the computer control software generates broadband diagnostic sequence control data enabling the digital data processing module 81 to determine source broadband characteristics of the ingress signal. The physical embodiment of the sampling broadband signal analyzer need not to be specially designed but could be assembled form commercially available building blocks. Similarly most of the software used by the data processing module is commercially available. While the integration with ingress monitoring and diagnostic functions as well as alarm management scenarios are specific to the system, it could be readily implemented by any person skilled in the art of computer programming.

Figure 9:
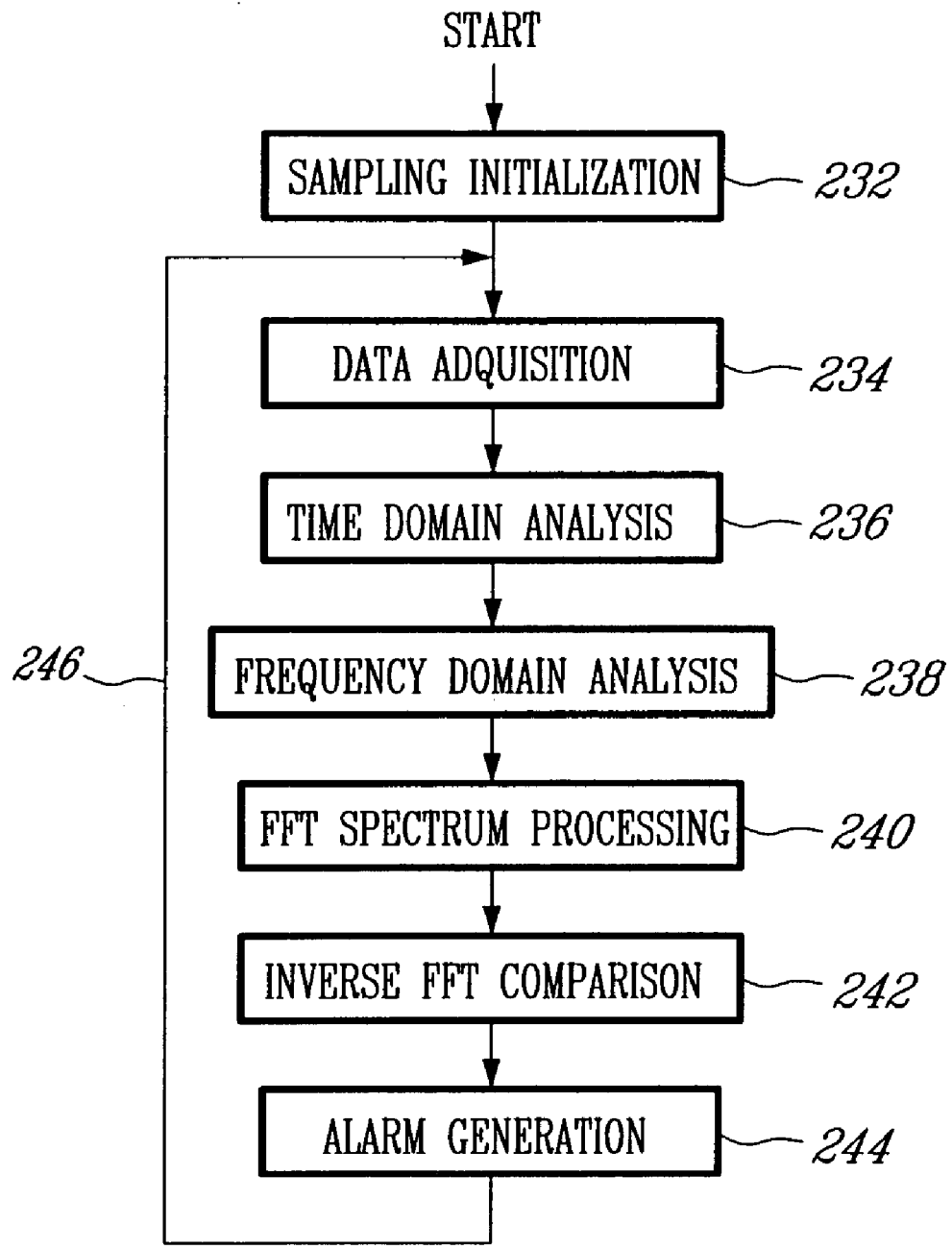
FIG. 9 is a flow sheet representing an example of processing sequence as performed by the FFT analyser and time domain analyser unit represented in FIG. 8.

Referring now to FIG. 9, an example of broadband signal analysis routine is shown in a flow chart. The sampling broadband signal analyzer starts processing at an initializing step 232, wherein the sampling parameters including number of samples, sampling frequency are being set, according to the commands received from the computer 23. A sampling mode is also selected, such as free sampling, time triggered sampling and signal triggered with threshold, slope, pre-trigger and post-trigger delay. In a typical installation, sampling is performed at 100 Ms/s, in lots of 4096 samples. Following the initializing step 232, acquisition of data is performed at a step 234. In the two following steps, the capture data is then analyzed according to the programmed monitoring sequence. At a step 236, the data is analyzed in the time domain, wherein measurements such as peak-to-peak amplitude, histogram of amplitude dB slices, percentage of time above threshold, power, frequency, envelope and average with previously stored data are being compared with predetermined thresholds. The same captured data is also analyzed in the frequency domain (step 238), involving FFT with a typical maximum resolution of 24.4 kHz, harmonic extraction and averaging with previously stored data, followed by comparisons with predetermined thresholds. At a following step 240, the resulting FFT spectrum is processed by either removing known artifacts therefrom or substituting base noise floor data for portions of the FFT spectrum outside a selected portion of interest. At a step 242, inverse of the resulting modified FFT spectrum is then obtained, which is compared to the original time domain data and/or to predetermined high and/or low thresholds. Whenever the thresholds are found to be overrun, alarms signals are generated and sent to the control computer at a following step 244. Finally, the routine is repeated for a new cycle at the data acquisition step 234 according to current sampling and monitoring parameters, as indicated by arrow 246. A rough estimate of the number of operations required for the above processing is about 400 000 operations. For quasi-real time analysis, at 41 µs for data acquisition, 10 Giga-operations/s is required. Although real time may not be economically viable, a 20% duty factor is feasible with presently available processing hardware.

Operation of the monitoring system 11 will be now summarized with reference to FIGS. 1 and 10. The control computer 23 with its implemented control software receives alarm signals from the RF detectors 12 through the signal processor 13 according to previously sent commands. It receives alarm message data from either the spectrum analyzer 67 or broadband analyzer 77 according to the monitoring sequence data as previously sent thereto by the control computer 23, which sends to the spectrum analyzer 73 or broadband analyzer command data to execute a specific diagnostic sequence, for returning the resulting diagnostic data to the control computer 23 accordingly. The control computer 23 also receives alarm indications from the CMTS 71 and communicates bi-directionnally with the network management system 103, which provides a higher level of network operation. The purpose of the control software implemented in the computer 23 is to integrate alarm indications from a multiplicity of sources, adaptively select actions such as commanding monitoring and diagnostic sequences, and report the status of the network to the network management system 16. The systems contains a number of scenarios of monitoring functions and diagnostic functions for each of the signal capture elements, i.e. the RF detectors 12 and the CMTS 71, as well as corresponding control functions for the selector switch 25. An operator of the monitoring system enters therein alarm handling scenarios that call for the execution of monitoring or diagnostic functions, and interprets the returned alarms and diagnostic indications, to sent to the network management system 103 pre-processed information, which indicate the occurrence of an ingress alarm and its severity, with presumed cause and location of the ingress. Typically, an operator working from a client terminal prepares monitoring sequences and thresholds for the RF detectors 12, spectrum analyzers 67 and broadband analyzer 77. The sequences and thresholds data can then be downloaded for execution to the RF detectors 12 in one or more hubs, to one or more spectrum analyzers connected to the network at one or more hubs, or to one or more broadband analyzers 77 at one or more hubs. Execution of the detecting and monitoring functions by the RF detectors 12 and analyzers 67, 77 causes alarm message generation whenever the set alarm conditions are reached, according to predetermined thresholds. The control software collects these messages in a centralized database for interrogation by operators. Conveniently, a system operator may enter personal preference information so as to receive automatically in quasi-real time alarm messages and other specified information from the database. The operator can then decide to analyze a particular condition by retrieving all pertinent data such as time stamp, source identification, alarm severity, recorded traces and thresholds. The operator can decide to diagnose and troubleshoot a faulty source of signal by taking control of the various equipment connected to the source, namely the RF detectors 11, spectrum analyzer 67 and broadband analyzer 77, by sending a proper command to the selector switch 25, while the running monitoring sequence is interrupted. Such an operator control mode can be performed by a field technician authorized by the system operator, from any local or remote terminal connected to the communication network. For example, a field technician working on a CATV network using the monitoring system 11 with an Avantron Spectrum Analyzer AT2000 in a bi-directional mode, can take control over the spectrum analyzer 67 connected to the same portion of the network for field troubleshooting. Information on analyzers 67, 77 settings and selector switch position used in the remote operation mode are sent to the head-end instrumentation while measurements including signal traces are returned to the field instruments for display. The remote operation mode working on one or more modes can also provide control of system switches installed within the CATV network such as the Electroline Clearpath™. The control software run by the computer 23 can also act automatically according to defined scenarios upon reception of alarms messages. Such actions may include pager or E-mail messages to on-duty and off-duty staff according to a time table, or as an adaptive system, execution of one or more diagnostic scenarios according to the type of alarm received. These diagnostic scenarios may include any of the manually available functions discussed above, including an automatic search through system switches such as Electroline Clearpath™ with all measurements being recorded according to the scenarios. Furthermore, upon the execution of an automatic diagnostic sequence, an alarm message can be generated. In addition to the ingress monitoring and alarm condition reporting, the spectrum analyzer 67 and broadband analyzer 77 can execute a programmable schedule of scans for statistical purposes. The test scenarios include but are not limited to the determination of: thresholds in the RF detectors 12, settings on the spectrum analyzer 67 (ex. focus on specific bandwidth, fast-slow scan, averaging or peak-hold, zero-scan with trigger mode to capture transients), settings on broadband analyzer 77 to trigger on a fast transient or to capture long disturbances with a long acquisition time, and actions on selector switches 25 for comparative analysis between sources. By knowing the topology of the network and comparing measurements before and after individual switch activation the location of an ingress problem can be pinpointed. The purpose of the adaptive measurement sequences is to automatically diagnose and pinpoint sources of network abnormal operation with minimal operators intervention. When an alarm message is sent to an operator it is accompanied by the results of the adaptive search.

A typical but not exclusive example of alarm handling scenario as performed by the control software run by the computer 23 will be now explained with reference to the flow diagram shown in FIG. 10, in view of FIG. 1. From a starting point at 248, the program verifies at a first testing step 250 if there is any alarm of a predetermined type from a CMTS 13 and from which optical receiver 16; if no, a subsequent testing step 252 is performed and if yes, a subsequent testing step 254 is performed, as explained later. At step 252, the program verifies if there is any alarm from an RF detector 12 of a predetermined type and from which optical receiver 16; if no, a following step 256 is performed and if yes, a following step 258 is performed, as explained later. At step 256, the program asks if there is any alarm from the a spectral analyzer 67 of a predetermined type and from which optical receiver 16; if no, the routine is repeated from the starting point 248 and if yes, a following step 260 is performed, as explained later. At step 254 mentioned before, the software verifies if the received CMTS alarm is severe and/or repeated; if no a subsequent step 262 is performed, as explained later and if yes, a further step 264 is performed, as being explained later. At step 258, the software asks if the RF detector alarm is severe and/or repeated; if no, step 262 is performed and if yes, step 264 is performed, as explained later. At step 260, the software verifies if the spectrum analyzer alarm 122 is severe and/or repeated; if no, step 262 is performed and if yes, step 264 is performed. At step 262, the software sent a minor alarm signal to network management system 103, while at step 264 the software sets diagnostic parameters in the spectrum analyzer 67, broadband analyzer 77 and selector switch 25 according to the ingress source receiver 16, starts execution of the diagnostic and sends a major alarm signal to the network management system 103. Upon reception of diagnostic data from the spectrum analyzer 67 and broadband analyzer 77, at a last step 266, the major alarm signal is repeated and sent to the network management system 103 along with the resulting diagnostic data indicating source characteristics of the detected ingress, before repeating the routine.

I claim:

1. A system for monitoring reverse paths of a bi-directional cable communication network to detect and analyze an ingress signal entering and carried by one of said reverse paths within a frequency band assigned thereto for carrying reverse signals, said ingress signal carrying path ending at a network sub-headend or headend through a corresponding one of a plurality of communication lines connected thereto, said system comprising:

a plurality of radio frequency signal detectors being provided with bandpass filter means and respectively coupled to said plurality of communication lines at said sub-headend or headend for receiving a radio frequency signal within said frequency band to generate corresponding output signals indicative of the strength of the received radio frequency signal, one of said frequency signal detectors being coupled to the communication line corresponding to the ingress signal carrying path for receiving the ingress signal with said reverse signals to generate corresponding one of said output signals which is indicative of the strength of the received ingress signal with said received reverse signals;

signal processor means adapted to perform selective analysis of the detector output signals by extracting source characteristics data from said detector output signals over a predetermined period of time and comparing said source characteristics data with at least one predetermined ingress thresholds to generate an alarm signal whenever the ingress signal is detected;

controller means receiving the alarm signal to generate monitoring sequence control data indicative of the communication line corresponding to the ingress signal carrying path to be monitored;

switch means having a plurality of inputs being connected to the communication lines and being responsive to the monitoring sequence control data to select the input connected to the communication line to be monitored; and signal monitor means coupled to an output of the switch means and being responsive to the monitoring sequence control data for analyzing the ingress signal wherein said signal monitor means include signal analyzer means for generating ingress signal analysis data and data processor means receiving said monitoring sequence control data to control operation of said analyzer means and comparing the ingress signal analysis data with predetermined threshold data to generate alarm message data, said controller means receiving the alarm message data to further generate diagnostic sequence control data according to the alarm message data, said signal monitor means being further responsive to the diagnostic sequence control data to determine source characteristics of the ingress signal.

2. The system according to claim 1, wherein said signal analyzer means comprise a 10 frequency scanning signal spectrum analyzer for generating ingress signal spectral analysis data.

3. The system according to claim 2, wherein said data processor means include local data processor means associated with said frequency scanning signal spectrum analyzer, said monitoring sequence control data including spectral monitoring sequence control data, said predetermined threshold data including spectral-related threshold data, the local processor means receiving the spectral monitoring sequence control data for comparing said ingress signal spectral analysis data with the spectral-related threshold data to generate spectral-related alarm message data included in said alarm message data, the diagnostic sequence control data including spectral diagnostic sequence control data.

4. The system according to claim 2, wherein said signal analyzer means further comprise a sampling broadband signal analyzer for generating ingress signal broadband analysis data.

5. The system according to claim 4, wherein said data processor means include first and second local data processor means respectively associated with said frequency scanning signal spectrum analyzer and said sampling broadband signal analyzer, said monitoring sequence control data including spectral monitoring sequence control data and broadband monitoring sequence control data, said predetermined threshold data including spectral-related threshold data and broadband-related threshold data, the first and second local processor means respectively receiving the spectral monitoring sequence control data and the broadband monitoring sequence control data for comparing the ingress signal spectral analysis data and the ingress signal broadband analysis data respectively with the spectral-related threshold data and the broadband-related threshold data to generate spectral-related alarm message data and broadband-related alarm message data included in said alarm message data, the diagnostic sequence control data including spectral diagnostic sequence control data and broadband diagnostic sequence control data.

6. The system according to claim 1, wherein said signal monitor means include a sampling broadband signal analyzer for generating ingress signal broadband analysis data.

7. The system according to claim 6, wherein said data processor means include local data processor means associated with said sampling broadband signal analyzer, said monitoring sequence control data including broadband monitoring control sequence data, said predetermined threshold data including broadband-related threshold data, said local processor means receiving the broadband monitoring sequence control data for comparing the ingress signal broadband analysis data with the broadband-related threshold data to generate broadband-related alarm message data included in said alarm message data, the diagnostic sequence control data including broadband diagnostic sequence control data.

8. The system according to claim 6, wherein said sampling broadband signal analyzer including time domain analyzer means and FFT analyzer means.

9. A system for monitoring reverse paths of a bi-directional cable communication network to detect and analyze an ingress signal entering and carried by one of said reverse paths within a frequency band assigned thereto for carrying reverse signals, said ingress signal carrying path ending at a network sub-headend or headend through a corresponding one of a plurality of communication lines connected thereto, said system comprising:

a plurality of radio frequency signal detectors being provided with bandpass filter means and respectively coupled to said plurality of communication lines at said sub-headend or headend for receiving a radio frequency signal within said frequency band to generate corresponding output signals indicative of the strength of the received radio frequency signal, one of said frequency signal detectors being coupled to the communication line corresponding to the ingress signal carrying path for receiving the ingress signal with said reverse signals to generate corresponding one of said output signals which is indicative of the strength of the received ingress signal with said received reverse signals wherein each said radio frequency signal detector includes:

an amplitude level detector circuit coupled to said bandpass filter means for generating an amplitude level signal for any said received frequency signal;

an amplitude level comparator circuit comparing the amplitude level signal with a predetermined amplitude threshold to generate an integrator control signal whenever the amplitude level signal exceeds the amplitude threshold;

an integrator circuit for integrating the amplitude level signal according to the integrator control signal to generate as one of said strength indicative signals a first output signal indicating an integrated value for the amplitude level signal over a time during which the amplitude level signal exceeds the amplitude threshold; and a further integrator circuit for integrating the amplitude level to generate as one of said strength indicative signals a second output signal representing an integrated value for the amplitude level signal;

signal processor means adapted to perform selective analysis of the detector output signals by extracting source characteristics data from said detector output signals over a predetermined period of time and comparing said source characteristics data with at least one predetermined ingress thresholds to generate an alarm signal whenever the ingress signal is detected wherein said signal processing means for analyzing the detector output signals derive a ratio of the first and second output signals for comparing thereof with said one or more predetermined ingress thresholds to generate said alarm signal whenever the ingress signal is detected;

controller means receiving the alarm signal to generate monitoring sequence control data indicative of the communication line corresponding to the ingress signal carrying path to be monitored:

switch means having a plurality of inputs being connected to the communication lines and being responsive to the monitoring sequence control data to select the input connected to the communication line to be monitored; and signal monitor means coupled to an output of the switch means and being responsive to the monitoring sequence control data for analyzing the ingress signal.

10. A system for monitoring reverse paths of a bi-directional cable communication network to detect and analyze an ingress signal entering and carried by one of said reverse paths within a frequency band assigned thereto for carrying reverse signals, said ingress signal carrying path ending at a network sub-headend or headend through a corresponding one of a plurality of communication lines connected thereto, said system comprising:

a plurality of radio frequency signal detectors being provided with bandpass filter means and respectively coupled to said plurality of communication lines at said sub-headend or headend for receiving a radio frequency signal within said frequency band to generate corresponding output signals indicative of the strength of the received radio frequency signal, one of said frequency signal detectors being coupled to the communication line corresponding to the ingress signal carrying path for receiving the ingress signal with said reverse signals to generate corresponding one of said output signals which is indicative of the strength of the received ingress signal with said received reverse signals wherein each said radio frequency signal detector includes:

an amplitude level detector circuit coupled to said bandpass filter means for generating an amplitude level signal for any said received frequency signal;

an amplitude level comparator circuit comparing the amplitude level signal with a predetermined amplitude threshold to generate an integrator control signal whenever the amplitude level signal exceeds the amplitude threshold;

an integrator circuit for integrating a portion of the amplitude level signal above the amplitude threshold according to the integrator control signal to generate as one of said strength indicative signals a first output signal indicating an integrated value for the amplitude level signal portion over a time during which the amplitude level signal exceeds the amplitude threshold; and a further integrator circuit for integrating the amplitude level to generate as one of said strength indicative signals a second output signal representing an integrated value for the amplitude level signal;

signal processor means adapted to perform selective analysis of the detector output signals by extracting source characteristics data from said detector output signals over a predetermined period of time and comparing said source characteristics data with at least one predetermined ingress thresholds to generate an alarm signal whenever the ingress signal is detected wherein said signal processing means for analyzing the detector output signals derive a ratio of said first and second output signals for comparing thereof with said one or more predetermined ingress thresholds to generate said alarm signal whenever said ingress signal is detected;

controller means receiving the alarm signal to generate monitoring sequence control data indicative of the communication line corresponding to the ingress signal carrying path to be monitored:

switch means having a plurality of inputs being connected to the communication lines and being responsive to the monitoring sequence control data to select the input connected to the communication line to be monitored; and signal monitor means coupled to an output of the switch means and being responsive to the monitoring sequence control data for analyzing the ingress signal.

11. A system for monitoring reverse paths of a bi-directional cable communication network to detect and analyze an ingress signal entering and carried by one of said reverse paths within a frequency band assigned thereto for carrying reverse signals, said ingress signal carrying path ending at a network sub-headend or headend through a corresponding one of a plurality of communication lines connected thereto, said system comprising:

a plurality of radio frequency signal detectors being provided with bandpass filter means and respectively coupled to said plurality of communication lines at said sub-headend or headend for receiving a radio frequency signal within said frequency band to generate corresponding output signals indicative of the strength of the received radio frequency signal, one of said frequency signal detectors being coupled to the communication line corresponding to the ingress signal carrying path for receiving the ingress signal with said reverse signals to generate corresponding one of said output signals which is indicative of the strength of the received ingress signal with said received reverse signals;

signal processor means adapted to perform selective analysis of the detector output signals by extracting source characteristics data from said detector output signals over a predetermined period of time and comparing said source characteristics data with at least one predetermined ingress thresholds to generate an alarm signal whenever the ingress signal is detected;

an amplitude level detector circuit coupled to said bandpass filter means for generating an amplitude level signal for any said received frequency signal;

a peak-and-hold detector circuit receiving the amplitude level signal for generating as a first one of said strength indicative signals a first output signal representing a peak value for said received frequency signal;

an amplitude level comparator circuit comparing the amplitude level signal with a predetermined amplitude threshold to generate an integrator control signal whenever said amplitude level signal exceeds the amplitude threshold;

a first integrator circuit for integrating the amplitude level to generate as a second one of said strength indicative signals a second output signal representing an integrated value for the amplitude level signal;

a second integrator circuit for integrating a portion of the amplitude level signal above the amplitude threshold according to the integrator control signal to generate as a third one of said strength indicative signals a third output signal representing an integrated value for the amplitude level signal portion over a time during which the level signal exceeds the amplitude threshold;

a third integrator circuit receiving the integrator control signal to generate as a fourth one of said strength indicative signals a fourth output signal representing a cumulative time during which the level signal exceeds the amplitude threshold;

a fourth integrator circuit for integrating the amplitude level signal according to the integrator control signal to generate as a fifth one of said strength indicative signals a fifth output signal representing an integrated value for the amplitude level signal over a time during which the level signal exceeds the amplitude threshold.

12. The system according to claim 11, wherein said amplitude level comparator circuit further generates a counter control output signal whenever said amplitude level signal successively raises above and drops below said amplitude threshold according to one or more amplitude cycles, each said radio frequency signal detector further including a counter circuit receiving said counter control output signal to generate as a sixth one of said strength indicative signals an output signal representing a number of said amplitude cycles.

13. The system according to claim 11, wherein said signal processing means for analyzing the detector output signals derive a ratio of said fourth and fifth output signals for comparing thereof with said one or more predetermined ingress thresholds to generate said alarm signal whenever the ingress signal is detected.

14. The system according to claim 11, wherein said signal processing means for analyzing the detector output signals derive a ratio of said second and fifth output signals for comparing thereof with said one or more predetermined ingress thresholds to generate said alarm signal whenever the ingress signal is detected.

15. A method of monitoring reverse paths of a bi-directional cable communication network to detect and analyze an ingress signal entering and carried by one of said reverse paths within a frequency band assigned thereto for carrying reverse signals, said ingress signal carrying path ending at a network sub-headend or headend through a corresponding one of a plurality of communication lines connected thereto, said method comprising the steps of:

detecting the reverse signals at said sub-headend or headend and taking at least two different types of measurements of said reverse signals over a predetermined period of time to generate source characteristics data;

analyzing the source characteristics data through comparison with at least one predetermined ingress thresholds to generate an alarm signal whenever the ingress signal is detected;

processing the alarm signal to generate monitoring sequence control data indicative of the communication line corresponding to the ingress signal carrying path to be monitored;

selectively monitoring said ingress signal communication line according to the monitoring sequence control data;

analyzing the ingress signal according to the monitoring sequence control data;

comparing ingress signal analysis data generated at said monitoring step with predetermined threshold data to generate alarm message data;

generating diagnostic sequence control data according to the alarm message data; and determining source characteristics of the ingress signal according to the diagnostic sequence control data.

16. The method according to claim 15, wherein said signal analyzing step is performed according to a frequency spectrum scanning mode to generate ingress signal spectral analysis data.

17. The method according to claim 16, wherein said monitoring sequence control data include spectral monitoring sequence control data, said predetermined threshold data including spectral-related threshold data, said comparing step includes the step of comparing said ingress signal spectral analysis with the spectral-related threshold data to generate spectral-related alarm message data included in said alarm message data, the diagnostic sequence control data including spectral diagnostic sequence control data.

18. The method according to claim 16, wherein said signal analyzing step is further performed according to a broadband sampling mode to generate ingress signal broadband analysis data.

19. The method according to claim 18, wherein said monitoring sequence control data include spectral monitoring sequence control data and broadband monitoring sequence control data, said predetermined threshold data including spectral-related threshold data and broadband-related threshold data, said comparing step includes the step of comparing the ingress signal spectral analysis data and the ingress signal broadband analysis data respectively with the spectral-related threshold data and the broadband-related threshold data to generate spectral-related alarm message data and broadband-related alarm message data included in said alarm message data, the diagnostic sequence control data including spectral diagnostic sequence control data and broadband diagnostic sequence control data.

20. The method according to claim 15, wherein said signal analyzing step is performed according to a broadband sampling mode to generate ingress signal broadband analysis data.

21. The method according to claim 20, wherein said monitoring sequence control data include broadband monitoring control sequence data, said predetermined threshold data including broadband-related threshold data, said comparing step including the step of comparing the ingress signal broadband analysis data with the broadband-related threshold data to generate broadband-related alarm message data included in said alarm message data, the diagnostic sequence control data including broadband diagnostic sequence control data.

22. The method according to claim 20, wherein said broadband sampling mode is one of a time domain analyzing mode and a FFT analyzing mode.

* * * * *